Jan. 20, 1942.   J. BELADA   2,270,713
CAP SELECTOR
Filed April 6, 1940   2 Sheets-Sheet 1
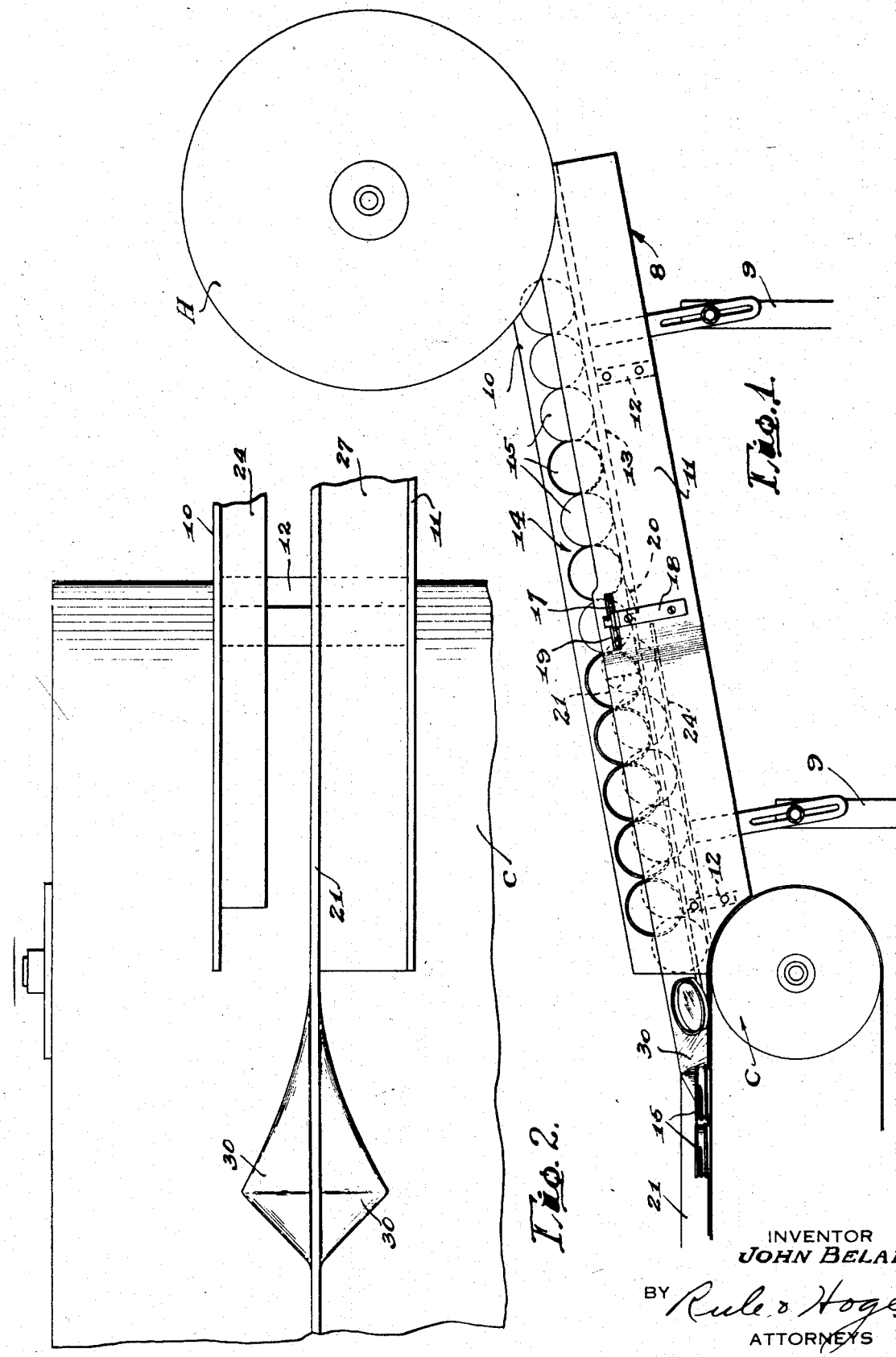
INVENTOR
JOHN BELADA.
BY Rule & Hoge
ATTORNEYS

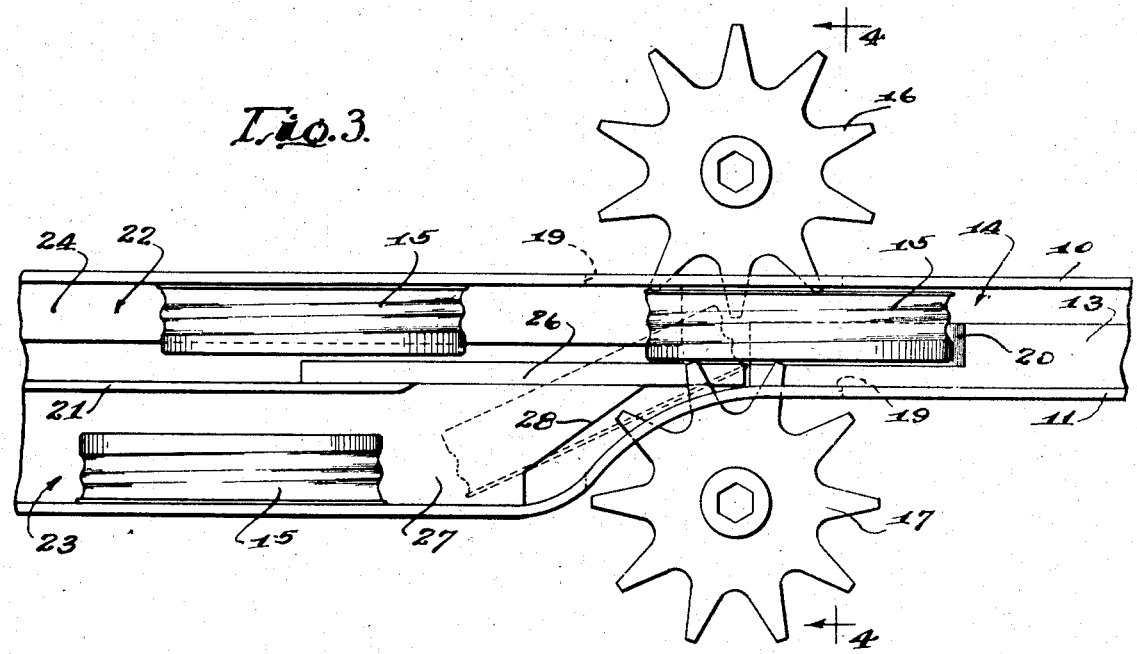
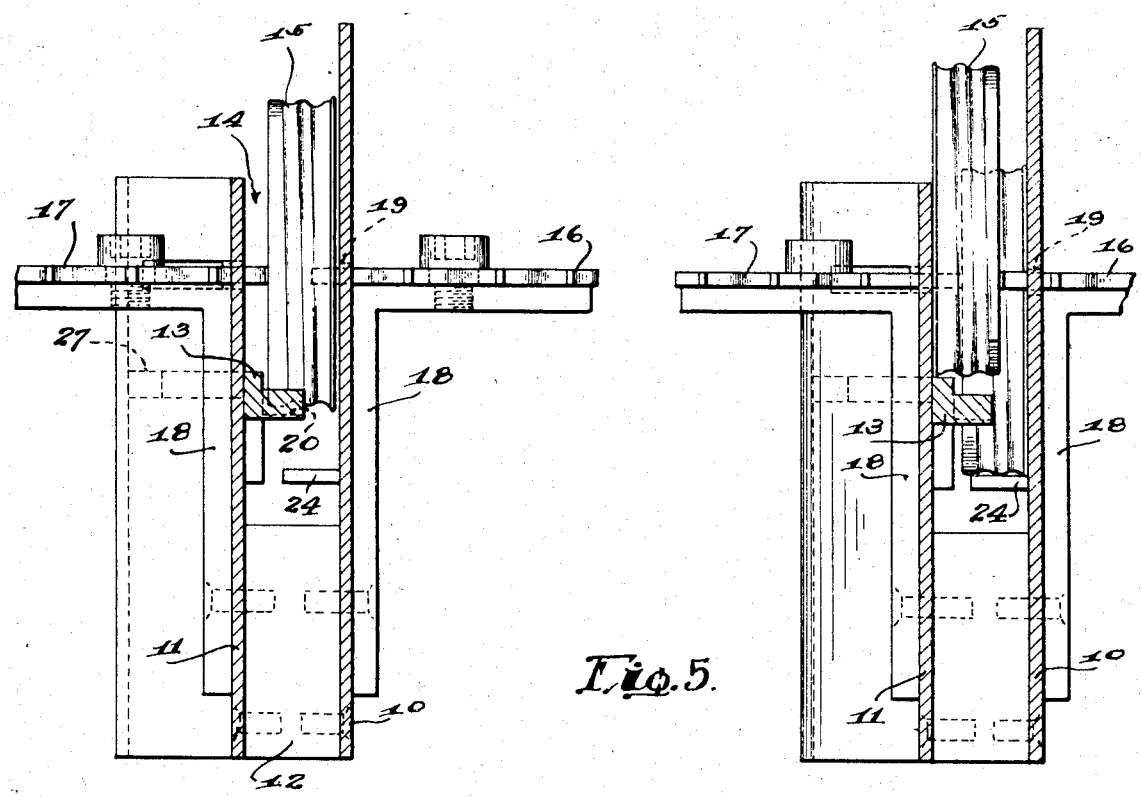

Patented Jan. 20, 1942

2,270,713

UNITED STATES PATENT OFFICE 2,270,713

CAP SELECTOR

John Belada, Glassboro, N. J., assignor to Owens-Illinois Glass Company, a corporation of Ohio Application April 6, 1940, Serial No. 328,309

2 Claims. (Cl. 198—33)

The present invention relates to closure handling apparatus and more particularly to an apparatus for automatically selecting and arranging bottle caps or the like for further manufacturing operations.

It is an object of the present invention to provide an apparatus for separating caps fed at random from a hopper in irregular oppositely facing relation so that they are delivered open-side up to a horizontal conveyor for additional operations.

Another object of the invention is the provision of novel means for diverting oppositely facing caps into separate channels while in an on-edge position.

Another object is the provision of a cap selector and separator adapted to receive bottle caps in a vertical on-edge position and deliver them by gravity to a horizontal conveyor open-side up preparatory to having liners inserted therein.

Other objects will be in part apparent and in part pointed out hereinafter.

In the drawings:

Fig. 1 is a side elevational view of the apparatus embodying my invention.

Fig. 2 is a partial plan view thereof.

Fig. 3 is a partial plan view including the selecting mechanism.

Fig. 4 is a vertical sectional view taken substantially along line 4—4 of Fig. 3.

Fig. 5 is a similar view illustrating a slightly advanced step in the selecting operation.

In the manufacture of bottle and jar closures the caps pass through many stages of development formerly necessitating much manual handling between steps in the manufacturing operation. Mechanism has been devised from time to time with the idea of eliminating as far as possible, manual labor in the handling of closures. The present invention is adapted for use in operations requiring the caps to be faced in one direction, particularly for the application of liners wherein the caps lie open-side up on a belt and are fed in that manner to the liner machine or to a zone in which the liners are inserted manually. The caps may be placed in bulk in a conventional hopper H (Fig. 1) to which the present invention is shown attached.

Generally, the device includes a trough 8 or chute adjustably supported on legs 9 in an inclined position so that the caps are fed therethrough by gravity. The lower end of the trough overlies one end of a horizontal conveyor C to which the caps are delivered. The trough 8 comprises a pair of spaced parallel side plates 10 and 11 secured together by spacing members 12. A strip 13 secured to the inner side of the plate 11 forms a partial bottom wall for a channel 14 therein. Caps 15 are discharged from the hopper H on edge and in random facing relation into the channel 14 which extends substantially the upper half of the length of the trough.

A pair of opposed star shaped selector or separating wheels 16 and 17 are mounted on brackets 18 secured outwardly of the plates 10 and 11 adjacent the lower end of the channel 14. The wheels are adapted to rotate about axes perpendicular to the bottom of the channel, the pointed rims of the wheels projecting into the channel through slots 19 in the side plates. The bottom strip 13 is provided on the upper surface of its lower unattached corner with a cut-out or depressed area 20 into which certain of the caps roll during movement to a lower channel 22 as will become apparent presently.

The side plate 11 is offset outwardly at the wheel 17 thereby increasing the width of the channel 14 and a partition plate 21 is disposed therein to form channels 22 and 23, the channel 22 being in effect a prolongation of the main channel 14. A strip 24 secured to the plate 10 substantially below the level of the strip 13 and parallel therewith, forms the bottom wall of the channel 22. A separating bar 26, the upper edge of which is level with the top of the strip 13, is secured to the partition 21 and bottom wall 27 of the channel 23 and extends between the partition and the strip 13.

As the caps 15 approach the star wheels 16 and 17 (Figs. 3, 4, and 5) the open side or mouth thereof may face either of the walls 10 or 11. As illustrated in Figs. 3 and 4, the cap if its open side faces the upper wheel 16, has by gravity rolled into the depressd area 20 under guiding contact with the pointed tips of the star wheel 17 bearing against the closed side of the cap and urging it toward the wall 10. The points on the wheel 16 have unobstructed entrance into the cap and offer no resistance thereto as the cap rolls to the lower level of the strip 24. The separating bar 26 provides an additional guiding surface during passage of the cap from the channel 14 to the channel 22.

The caps with the open side facing the wall 11 roll along the strip 13 and are engaged by the star wheel 16 (Fig. 5) which holds each cap in close proximity to said wall as it reaches the end of the strip 13. Caps having an outwardly turned wire edge, have a natural tendency to lean away from the edge while rolling, due to the difference in circumference of the edge and top. It will thus be apparent that the caps will roll with the edge in or near the corner formed by the wall 11 and strip 13 and in that manner will override the depressed area 20 in the end of the strip. The wall 11 is curved outwardly to form the offset portion thereof and the channel 23 and also to enable the wheel 16 to move the cap to the dotted line position in Fig. 3. The bottom wall 27 terminates short of the curved side wall 11 and the end is cut at an angle to the bar 26 to form a cam surface 28 against which the wire edge of the cap bears as the cap is directed into the channel 23 by the wheel 16. The caps are thus "sorted" into separate groups before being discharged from the trough and turned over on the conveyor.

The partition 21 extends beyond the lower ends of the walls 10 and 11 over the conveyor C and is provided on each side with cams 30 for positively turning the caps onto their closed sides. The bottom edge of each cam curves outwardly to a position nearly parallel with the top of the conveyor and presents a curved sloping surface from the lower edge to the top of the partition. Thus as the caps leave the chute they are turned outwardly from the bottom and fall open-side up on the moving conveyor belt.

Modifications may be resorted to within the spirit and scope of the appended claims.

I claim:

1. Apparatus of the character described comprising an inclined chute, a pair of parallel adjacent channels connected to the lower end of the chute, one of said channels being disposed in a lower plane throughout its length than but parallel to the other channel and said chute, a pair of star wheels freely rotatable substantially in the plane of the chute and having fingers projecting into the chute from opposite sides thereof substantially at the juncture of the chute and channels, and cams at the lower end of the channels for changing the position of articles as they are discharged from the latter.

2. Apparatus of the character described comprising an inclined chute, a pair of parallel adjacent channels connected to the lower end of the chute, one of said channels being disposed in a lower plane throughout its length than, but parallel to the other channel and said chute, a pair of star wheels freely rotatable substantially in the plane of the chute and having fingers projecting into the chute from opposite sides thereof substantially at the juncture of the chute and channels, a horizontal conveyor in proximity to the lower end of the chute and cams arranged at the lower end of said channels for changing the position of the articles as they are discharged from the latter and placing them in two parallel longitudinal rows upon the conveyor.

JOHN BELADA.